UNITED STATES PATENT OFFICE.

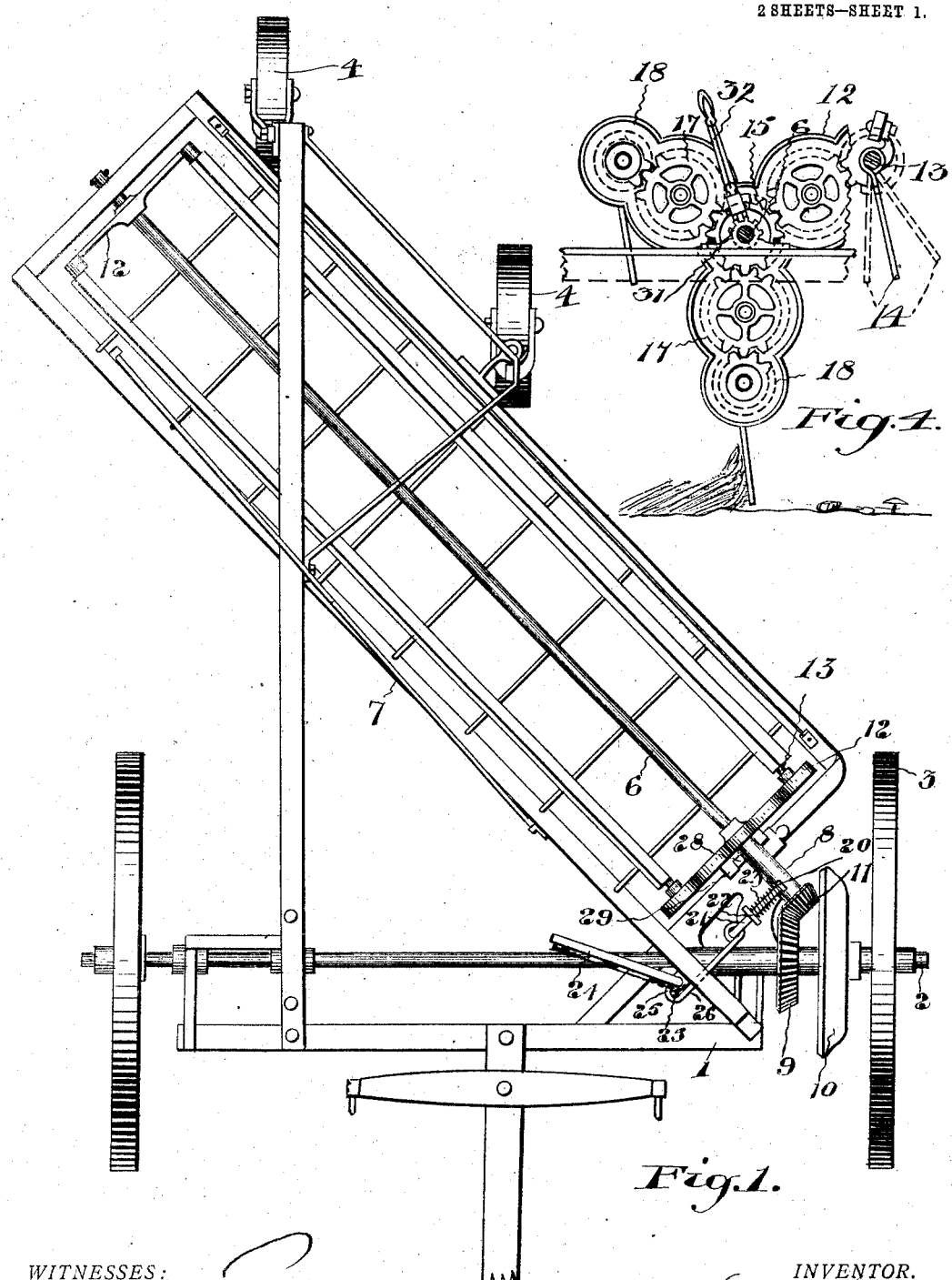

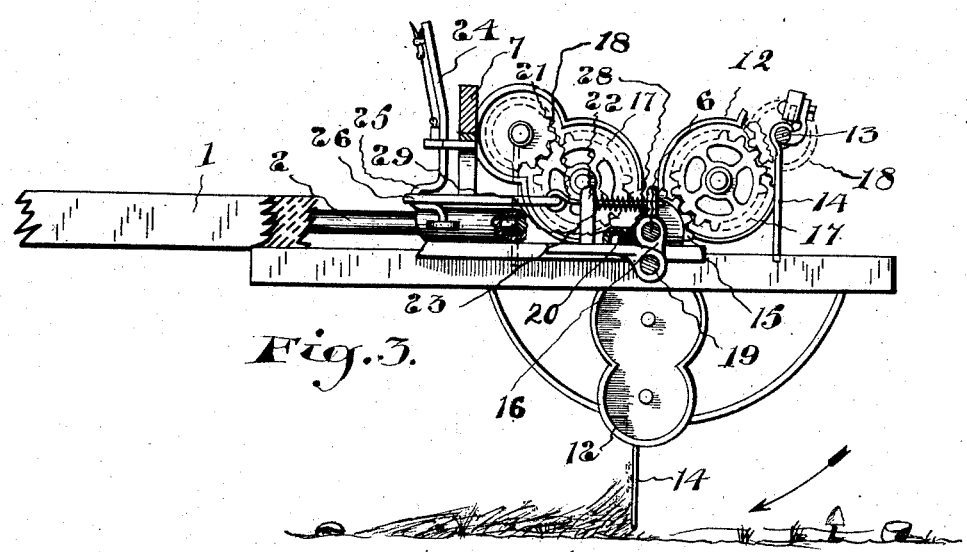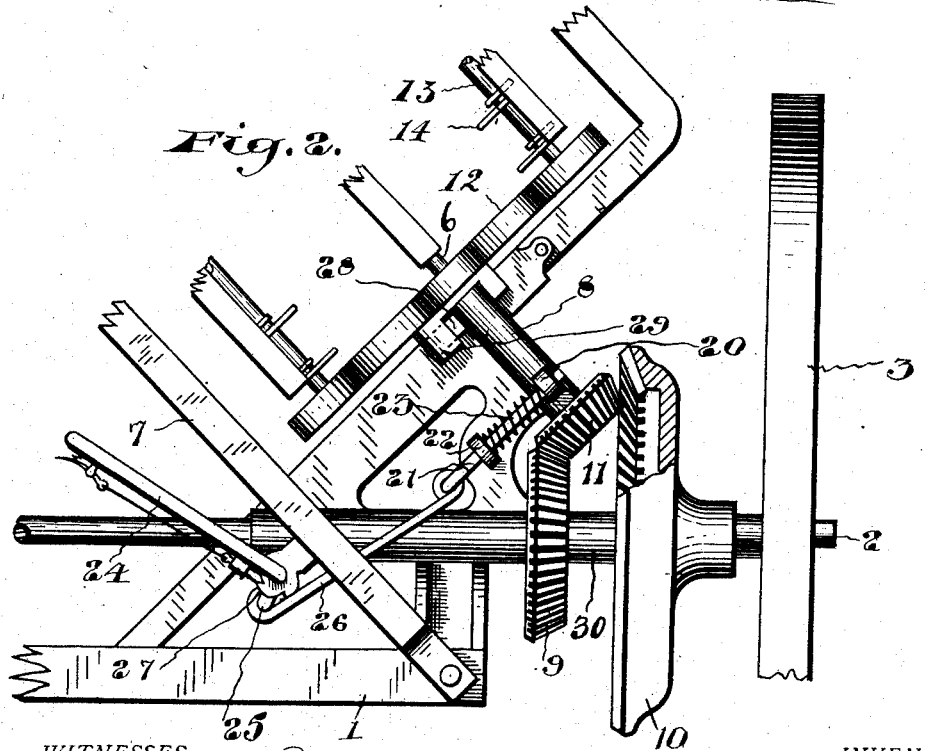

LYMAN MELVIN JONES, OF TORONTO, ONTARIO, CANADA, ASSIGNOR TO MASSEY-HARRIS COMPANY, LIMITED, OF TORONTO, CANADA.

COMBINED HAY RAKE AND TEDDER.

No. 928,457.  Specification of Letters Patent.  Patented July 20, 1909.

Application filed November 27, 1908. Serial No. 464,720.

*To all whom it may concern:*

Be it known that I, LYMAN MELVIN JONES, of the city of Toronto, in the Province of Ontario, Canada, have invented certain new and useful Improvements in Combined Hay Rakes and Tedders, of which the following is a specification.

This invention relates to side delivery hay rakes of the type in which a plurality of bars each provided with a series of teeth are revolved about an axis in such a manner that the teeth are carried around the axis without any material change of their angle relative to the surface of the ground.

My object is to devise a construction for such a rake which will enable it to be used as a hay tedder whenever desired. I accomplish this object by providing the rake with means whereby the rake bars may be rotated about the axis of the machine in either the normal or in a reverse direction as may be desired.

The teeth in order to adapt them for the double purpose to which they are to be put will preferably be made straight and hung approximately vertical.

Figure 1 is a plan view of my combined hay rake and tedder. Fig. 2 is an enlarged plan view of the parts, more particularly connected with my invention. Fig. 3 is an end elevation of the frame carrying the rake bars, showing particularly the method of moving the axle on which the frame rotates. Fig. 4 is a detail of a modification of the device by means of which the angle of the teeth may be changed when desired.

In the drawings like numerals of reference indicate corresponding parts in the different figures.

The device in its main features does not differ from side delivery rakes now in use. A frame 1 carries the axle 2, which is suitably carried thereon and has the ground wheels 3 journaled thereon. The frame is rearwardly extended and carries the trailing wheels 4. The rake carrying frame 5 is carried by a shaft 6 which is journaled on the diagonal part 7 of the frame of the device. The shaft is journaled in the rear end of the frame and at the front end of the frame is journaled in a sleeve 8 slidable transversely on the frame as hereinafter described. This sleeve is guided and steadied by a projection 28 which slides under a hook 29 formed on the frame of the device. A sleeve 30 is driven by the ground wheel 3 and has the bevel gear wheel 9 secured thereto and also the internal bevel gear wheel 10. A bevel pinion 11 is secured to the end of the shaft 6. It is evident that by moving the shaft 6 this bevel pinion may be brought into mesh with either the bevel gear 9 or internal bevel gear 10 and that the shaft may thus be driven in either direction.

The ends 12 of the rake carrying frames are suitably shaped to carry the bars 13 which are journaled therein and which each carry a series of teeth 14. As the rake carrying frame rotates with the shaft these rake bars will be revolved around the latter as an axis, carrying the teeth with them. Means are usually provided for maintaining the teeth at a constant angle to the horizontal. For this purpose a gear wheel 15 is held stationary at the end of the axle which meshes with the gear wheels 17 journaled on the front end 12 of the rake carrying frame meshing with gear wheels 18 on the ends of the rake bars 13. This gearing will accomplish the desired purpose.

The shaft 6 is moved to move the bevel pinion 11 into or out of gear with the gears 9 and 10 by the following mechanism. The sleeve has an arm 16 formed thereon pivoted at 19 on the frame. An arm 20 extends up from the sleeve and has secured thereto a rod 21 slidable through a bracket 22 on the frame of the machine. A coil spring 23 is placed between the rock arm 20 and the bracket 22 and tends to move the rock arm 20 to move the bevel pinion 11 out of mesh with the bevel gear 9.

For the purpose of moving the rod 21 I journal a bent crank lever 24 on a suitable support on the frame of the machine and to the crank 25 thereof I pivotally connect one end of a connecting rod 26, the other end of which is pivotally connected with the end of the rod 21. This hand lever is provided with the usual retaining device adapted to engage a notched quadrant 27. By shifting this lever the bevel pinion 11 may be held in mesh with either the bevel gear 9, the internal bevel gear 10 or with neither. When the bevel pinion 11 is in mesh with the bevel gear 9 the motion of the rakes is in the direction indicated by an arrow in Fig. 3, and the device then acts as a side delivery rake. When, however, the bevel pinion 11 is in mesh with the internal bevel gear 10, the direction of the movement is reversed and the device forms an effective hay tedder to toss up and loosen a crop of hay lying on the ground.

In Fig. 4 I show the gear wheel 15 as provided with a hand lever 32 to which it is connected. This hand lever is provided with a notched quadrant 31 formed on the sleeve 8 carrying the axle. By rotatably adjusting the gear 15 it is evident that any desired angle may be given to the teeth 14 to best adapt them to the work the machine is performing either raking or tedding.

While I consider the details of the gearing shown as best adapted for my purpose, I do not desire to limit myself to the exact constructions shown, as these might be varied widely without departing from the spirit of my invention.

What I claim as my invention is:

1. In a combined hay rake and tedder the combination of a rotary frame; rake bars carried by said frame; teeth carried by said rake bars; and means for rotating the frame in either direction.

2. In a combined hay rake and tedder the combination of a rotary frame; rake bars carried by said frame; teeth carried by said rake bars; means for maintaining the teeth at a constant angle to the horizontal; and means for rotating the frame in either direction.

3. In a combined hay rake and tedder the combination of a rotary frame; teeth carried by said frame; a shaft; a frame on which said shaft is transversely movable; an axle carried on said latter frame; ground wheels supporting said axle; a bevel gear wheel driven from a ground wheel; an internal bevel gear wheel also driven from a ground wheel; a bevel pinion fast on the end of the shaft; and means for moving the shaft to place the bevel pinion in mesh with either of the first mentioned bevel gears.

4. In a combined hay rake and tedder the combination of a rotary frame; teeth carried by said frame; a shaft adapted to rotate said frame; a frame on which said shaft is transversely movable; an axle carried on said latter frame; ground wheels supporting said axle; a bevel gear wheel driven from a ground wheel; an internal bevel gear wheel also driven from a ground wheel; a bevel pinion fast on the end of the shaft; and means for moving the shaft to place the bevel pinion in mesh with either of the first mentioned bevel gears or neither.

5. In a combined hay rake and tedder the combination of a rotary frame; teeth carried by said frame; a shaft adapted to rotate said frame; a frame on which said shaft is transversely movable; an axle carried on said latter frame; ground wheels supporting said axle; a bevel gear wheel driven from a ground wheel; an internal bevel gear wheel of greater diameter also driven from a ground wheel; a bevel pinion fast on the end of the shaft; and means for moving the shaft to place the bevel pinion in mesh with either of the first mentioned bevel gears.

6. In a combined hay rake and tedder the combination of a rotary frame; teeth carried by said frame; means for maintaining the teeth at a constant angle to the horizontal; a shaft adapted to rotate said frame, a frame on which said shaft is transversely movable; an axle carried by said latter frame; ground wheels supporting said axle; a bevel gear wheel driven from a ground wheel; an internal bevel gear wheel also driven from a ground wheel; a bevel pinion fast on the end of the shaft; and means for moving the shaft to place the bevel pinion in mesh with either of the first mentioned bevel gears.

7. In a combined hay rake and tedder the combination of a rotary frame; teeth carried by said frame; a shaft; a frame on which said shaft is transversely movable; an axle carried on said frame; ground wheels supporting said axle; a bevel gear wheel driven from a ground wheel; an internal bevel gear wheel also driven from a ground wheel; a bevel pinion fast on the end of the shaft; means for moving the shaft to place the bevel pinion in mesh with either of the first mentioned bevel gears, and means for simultaneously varying the angle of the teeth.

8. In a combined hay rake and tedder the combination of a rotary frame; a rake bar journaled therein; teeth carried by said rake bar; a gear wheel secured to the rake bar; a normally stationary gear wheel journaled in axial alinement with the axis of the rotary frame; an intermediate gear meshing with the aforesaid gear wheels; and means for rotarily adjusting the normally stationary gear wheel.

Toronto, Ont. this first day of October 1908.

LYMAN MELVIN JONES.

Signed in the presence of—
GEO. VALENTINE,
R. W. CHISHOLM.